July 23, 1940.                  C. H. McKINSTRY                 2,208,771
                            LOCOMOTIVE BRAKE EQUIPMENT
                             Filed May 5, 1939         2 Sheets-Sheet 2
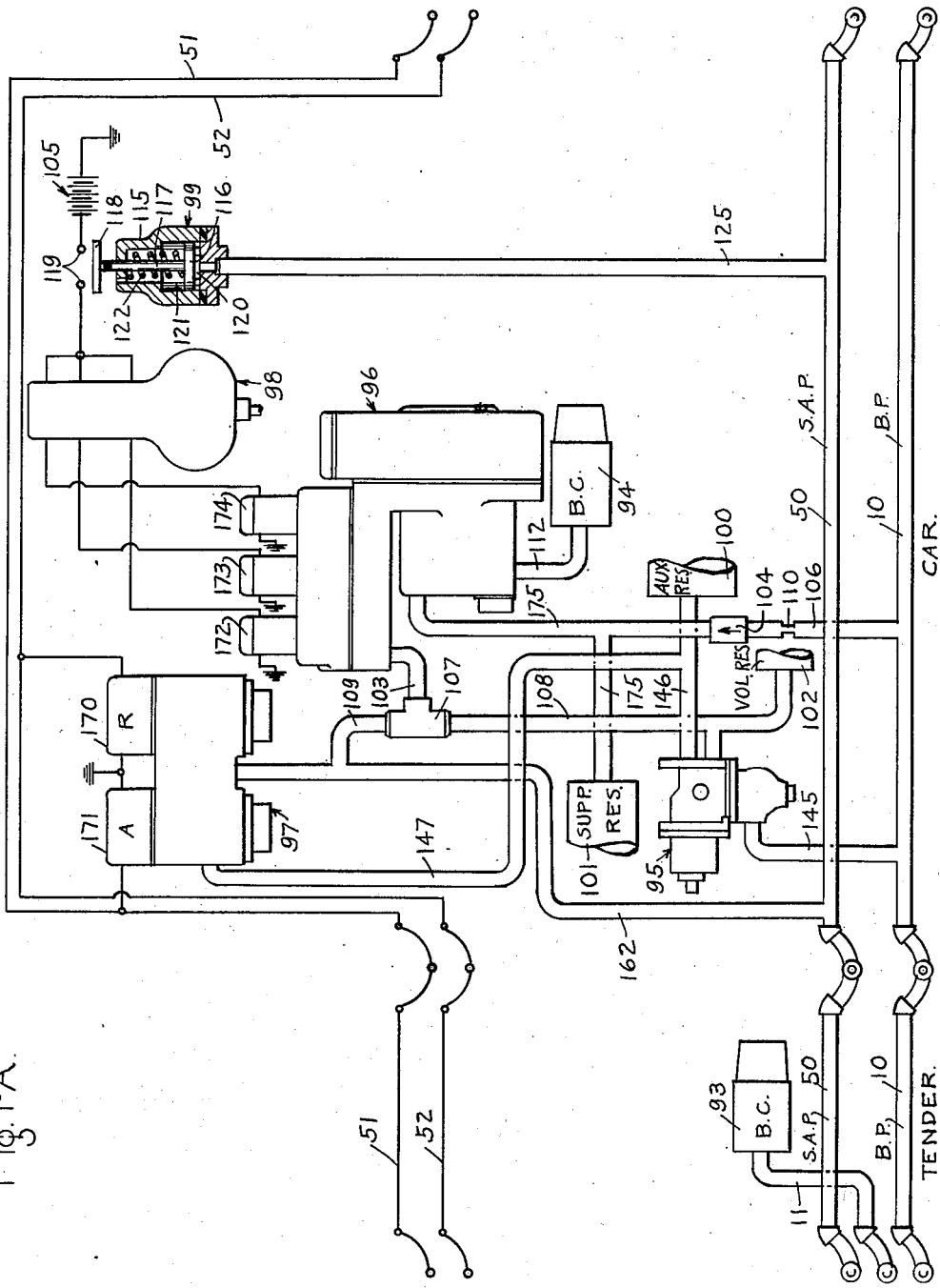
INVENTOR
CHARLES H. McKINSTRY
BY 
ATTORNEY Patented July 23, 1940

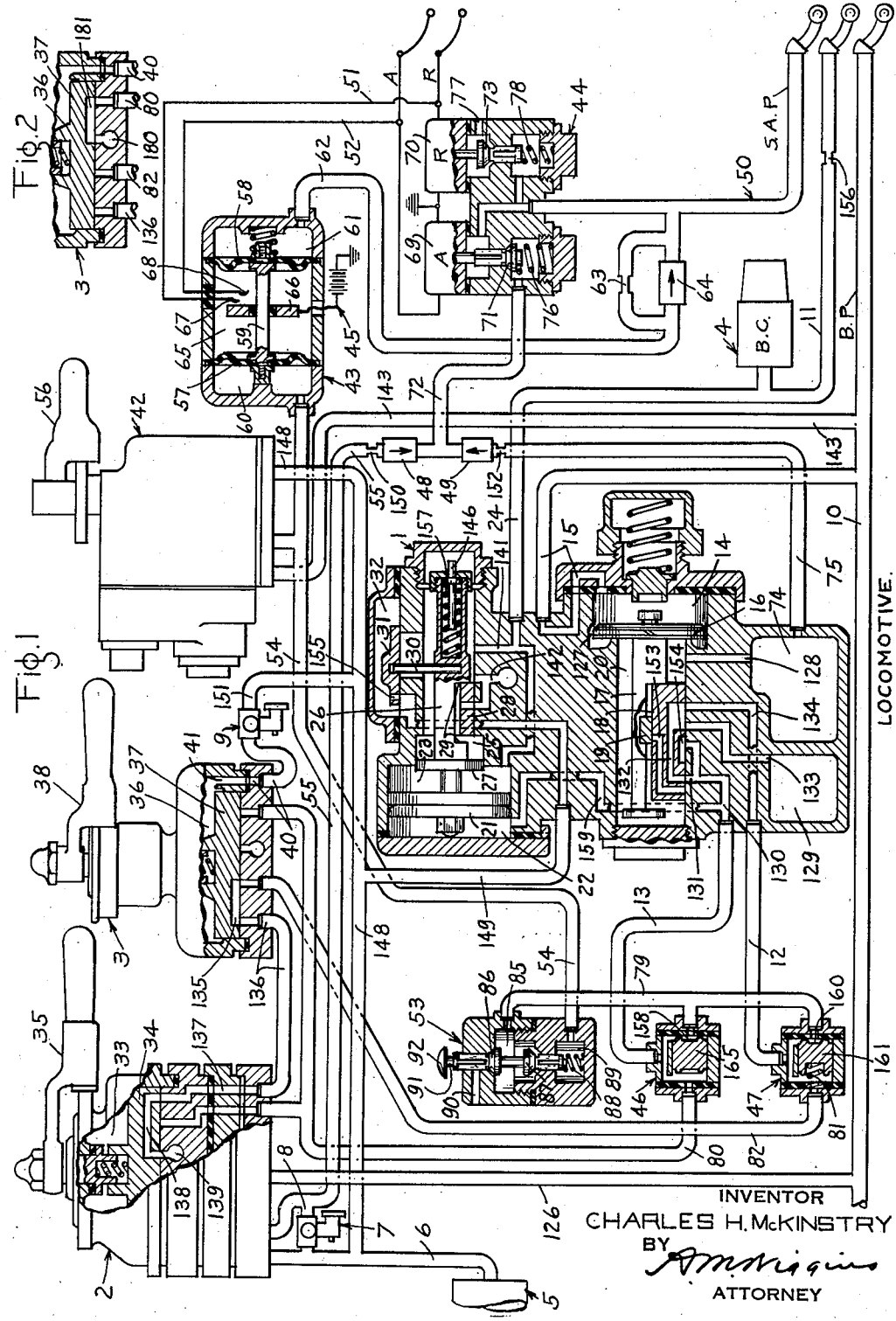

2,208,771

UNITED STATES PATENT OFFICE 2,208,771

LOCOMOTIVE BRAKE EQUIPMENT

Charles H. McKinstry, Wilmerding, Pa., assignor to The Westinghouse Air Brake Company, Wilmerding, Pa., a corporation of Pennsylvania Application May 5, 1939, Serial No. 271,870

18 Claims. (Cl. 303—15)

This invention relates to fluid pressure brakes and more particularly to fluid pressure brake equipment for railway locomotives.

Until quite recently railway locomotives were equipped with brake control equipment which was so arranged that the brakes on either standard passenger or standard freight trains could be properly controlled from any locomotive so equipped. Heretofore, both passenger and freight trains were provided with brake equipments operating on the well known automatic principle only. Provision was made on the locomotives, however, for the independent control of the locomotive brakes, so as to protect the locomotive driver wheels and to use the inertia of the locomotive to the best advantage in handling the train.

Within recent years a new series of passenger trains have been developed for operation at ultra-high speeds. The operation of trains at such high speeds has necessitated the development of a new type of brake equipment. The brake equipment for such trains are of the dual control type. That is, they include an electro-pneumatic portion adapted to operate on the well known straight air principle, in addition to a pneumatic portion adapted to operate on the automatic principle.

As a result of the experience gained from the operation of high speed trains equipped with combined straight air and automatic brake equipments, a new brake equipment for passenger cars has been developed. The equipment may be adapted for either combined straight air and automatic operation with control according to train speed or for automatic operation only without speed control.

This new equipment adapted for automatic operation only without speed control is fully described in Westinghouse Air Brake Company's Instruction Pamphlet No. 5050-6, issued August 6, 1937. This equipment adapted for combined straight air and automatic operation with control acording to train speed is fully described in Westinghouse Air Brake Company's Instruction Pamphlet No. 5064-7, issued November 7, 1937.

The essential elements of the speed controlled equipment are fully described and claimed in the patent to E. E. Hewitt, No. 2,140,624, issued December 20, 1938. As fully explained in that patent this equipment makes use of a control valve device which is controlled automatically according to the speed of the car or train to cause variations of the brake cylinder pressure in a series of steps as the speed of the car or train reduces in being brought to a stop.

The heretofore and still widely employed standard brake equipment for passenger cars is that commonly known as the "UC" equipment. This equipment operates on the automatic principle only. The new equipment as set forth in Instruction Pamphlet No. 5050-6 and known as the "D-22-P" passenger car equipment also operates on the automatic principle. This equipment is a substitute for the "UC" on cars which later may be converted to the new equipment with speed control and is known as the "D-22-P. G. E." passenger equipment, as set forth in the Instruction Pamphlet No. 5064-7. Since the "UC" and "D-22-P" equipment have no provision for operation by straight air control, it will be apparent that passenger cars so equipped cannot be employed where straight air control is required. In cases where straight air control is required it is preferred that passenger cars be equipped with means providing for both straight air and automatic operation with speed control of the car brakes, such as incorporated in the brake equipment described in Instruction Pamphlet No. 5064-7.

In addition to the newly developed passenger car equipment above referred to, there was also recently developed a new equipment for freight cars known as the "AB" equipment. The characteristics of this equipment are somewhat different from either the "UC," "D-22-P" and "D-22-P. G. E." equipments or those proposed for the ultra-high speed trains.

It is apparent that for some time to come there will be at least four different types of car brake equipments which will need be controlled by the brake control equipment on the locomotive. In the first place, these will be the now standard "UC" equipment for passenger cars, as well as the now standard "AB" equipment for freight cars. In addition, there will be (and there are now in operation) cars equipped with the new D-22-P equipment as covered by Instruction Pamphlet No. 5050-6, conditioned for automatic control only. Then there will also be other cars equipped with the new D-22-P. G. E. brake equipment conditioned for both straight air and automatic operation with speed control.

It is, of course, probable that eventually all passenger cars will be equipped with the same type of equipment, as for example that providing for both straight air and automatic operation with speed control. But until such a time arrives it will be evident that the brake control equipment provided on locomotives should, in the interest of efficiency, be arranged to control the brakes of either of these car equipments. This, however, presents a problem which involves many practical difficulties.

In the control of trains comprising cars equipped with either "UC" equipment or "AB" equipment, provision has heretofore been made for control of the locomotive brakes independently of control of the train brakes. This feature has not been considered desirable or necessary for the special locomotives provided in connection with ultra-high speed trains.

Now in order that the differently equipped cars may be used with the utmost regard for efficiency, it will be apparent that at times trains will be made up comprising either all cars equipped with one type of brake equipment, or with some cars equipped with one type of brake equipment and other cars equipped with another type of brake equipment, and in extreme cases all four of the brake equipments above referred to may be present in one train. In any case the control equipment on the locomotive should be capable of properly controlling the brakes throughout either type of train with the same degree of safety and flexibility.

The heretofore and still widely employed standard brake equipment for locomotives is that commonly known as the No. "6-ET" equipment. This equipment operates on the automatic principle only.

It is accordingly a general object of the present invention to provide a modified "No. 6-ET" locomotive brake control equipment which may be operable to control the brakes throughout a train regardless of which of the above enumerated types of brake equipments is supplied on the individual cars.

A further object of the invention is to provide a modified "No. 6-ET" locomotive equipment which is arranged to control the brakes throughout a train by either straight air operation or by automatic operation, and which at the same time provides for control of the brakes on the locomotive independently of control of the brakes on the train.

A yet further object of the invention is to provide a locomotive brake equipment of the character indicated, which provides for flexible control of both the locomotive and the car brakes, in harmony with each other, and of the locomotive brakes independently of the car brakes.

Other objects and advantages of the invention, dealing particularly with the arrangement and construction of parts for generally carrying out the above stated objects and to provide features to be hereinafter stated, will be understood from the following description of an embodiment of the invention, which is illustrated in the attached drawings.

In the accompanying drawings, Figs. 1 and 1A, when taken together and placed end to end, illustrate an embodiment of the invention.

Fig. 2 shows the communications established by the independent brake value when in its release position.

In order that my invention shall be clearly understood, I shall first describe the elements of the "No. 6-ET" locomotive brake equipment which are illustrated in Fig. 1 of the drawings. Then I shall describe the rearrangement of the parts of, and the new elements which are added to the "No. 6-ET" locomotive equipment, to carry out the objects of my invention. Next I shall describe the car equipment and then the operation of the improved equipment.

"No. 6-ET" Locomotive Equipment

Considering first briefly the present standard portion of the "No. 6-ET" equipment illustrated in Fig. 1, this includes a distributing valve device 1, an automatic brake valve device 2, an independent brake valve device 3, one or more brake cylinders 4, a main reservoir 5 adapted to be supplied with fluid under pressure in any suitable manner, a main reservoir pipe 6, and a feed valve device 7 which is adapted to deliver fluid at a chosen pressure from the main reservoir to a feed valve pipe 8. The equipment also comprises a reducing valve device 9 which is adapted to deliver fluid at a chosen pressure to the independent brake valve device 3, a brake pipe 10 which is adapted to extend throughout the train and a brake cylinder pipe 11 which is adapted to be connected to the brake cylinder on the locomotive tender. The equipment further comprises a distributing valve release pipe 12 connecting the distributing valve 1 to the independent brake valve 3, and an application cylinder pipe 13 connecting the distributing valve 1 with both the automatic brake valve 2 and the independent brake valve 3.

Considering now more in detail the devices referred to above briefly, the distributing valve device 1 is of the usual construction. It comprises a casing containing the usual equalizing portion and application portion. The equalizing portion includes a chamber 14 connected through a passage and pipe 15 to the brake pipe 10 and containing a piston 16 having a stem 17 for operating a main slide valve 18 and an auxiliary slide valve 19, the two slide valves being contained in a slide valve chamber 20 which is connected to a pressure chamber 74 by a passage 128.

The application portion of the distributing valve device comprises a piston 21 having at one side a chamber 22 and at the other side a chamber 23 open to the brake cylinder 4 through a passage 141 and pipe 24. Extending to the right from piston 21 and through a valve chamber 25 is a piston stem 26 having mounted thereon a baffle piston 27, separating chambers 23 and 25. An exhaust slide valve 28 is disposed in chamber 25 between face shoulders 29 on the stem 26 and is adapted to be operated thereby. Projecting upwardly from the stem 26 is a driving pin 30 operatively engaging an application slide valve 31 contained in a chamber 32.

The automatic brake device 2 is of the usual construction and comprises a casing having a chamber 33 therein in which is mounted a rotary valve 34 operated by means of a handle 35.

The independent brake valve device 3 is of the usual construction and comprises a casing having a chamber 36 therein in which is mounted a rotary valve 37 adapted to be turned to the various brake operating positions by an operating handle 38.

The feed valve 7 is preferably of standard construction and is adapted to supply fluid at reduced pressure to the brake pipe, by way of the feed valve pipe 8, and passages in the automatic brake valve device 2.

The reducing valve device 9 may be similar in construction to the feed valve device 7, and is adapted to supply fluid at a desired reduced pressure, such as that employed in controlling the brakes by operation of the independent brake valve device 3, to a pipe and passage 40 which communicates with a port 41 in the rotary valve 37 of the independent brake valve device 3.

ADDITIONS AND CHANGES TO "NO. 6–ET" EQUIPMENT

In order that locomotives now equipped with "No. 6–ET" equipment for automatic brake control only may be provided with both a straight air and an automatic brake control system, it is necessary to add several devices and pipes to the equipment hereinbefore referred to.

Considering now briefly the devices added, I provide a self-lapping brake valve device 42, a master switch device 43, an application and release magnet valve device 44 and a source of electrical energy indicated as a storage battery 45. I also provide two double check valves 46 and 47 and two one way check valves 48 and 49 of the usual construction. In addition, I have provided a straight air pipe 50 and application and release wires 51 and 52 respectively, both of which are adapted to extend throughout the train. Further, I provide a foot valve device 53, the purpose of which will be disclosed presently, and a control pipe 54 connecting the foot valve device with the brake valve 42 and the master switch 43. Since in the "No. 6–ET" equipment the feed valve pipe extends only to the automatic brake valve, I provide an additional feed valve pipe 55, which, as illustrated in Fig. 1, is normally adapted to supply fluid under pressure from the feed valve device 7 to the magnet valve device 44.

Considering now the added devices in detail, the self-lapping brake valve device 42 is of well known construction. The brake valve device controls the supply of fluid under pressure from the main reservoir 5 to the control pipe 54 for effecting a straight air application of the brakes and controls the release of fluid from the control pipe 54 to effect a release of the straight air brakes. It is deemed unnecessary for present purposes to describe the construction and operation of the self-lapping brake valve 42 in detail, it being necessary only to understand that the pressure established in the control pipe 54 is in accordance with the degree of movement of an operating handle 56 of the brake valve device 42 from a normal release position into an application zone.

The master switch 43, which is provided for controlling the energization and deenergization of the application and release train wires 51 and 52, comprises a casing containing two spaced flexible diaphragms 57 and 58 operatively connected together by a stem 59. The diaphragm 57 has at its outer face a chamber 60 connected to the control pipe 54, while the diaphragm 58 has at its outer face a chamber 61 connected to a pipe 62 which is connected to the straight air pipe 50 through a choke 63 and by way of a one-way check valve device 64 which permits rapid release.

A chamber 65 is formed intermediate the diaphragms 57 and 58 and secured to but insulated from the stem 59 in this chamber is a movable contact 66. To this movable contact 66 is connected a terminal of the battery 45, the other terminal of which is grounded. Two resilient contacts or fingers 67 and 68 carried by and insulated from the casing in any suitable manner project into the chamber 65 and are arranged to be successively engaged by the movable contact 66 upon movement thereof toward the right hand, and disengaged in the reverse order upon movement of the contact 66 toward the left hand. The contacts 67 and 68 are respectively connected to the release train wire 52 and application train wire 51.

The application and release magnet valve device 44 comprises an application magnet 69 having one terminal connected to the application train wire 51 and the other to ground, and a release magnet 70 having one terminal connected to release train wire 52 and the other to ground.

The application magnet 69 is provided for unseating an application valve 71 upon energization of the magnet so as to supply fluid under pressure from a pipe 72 to the straight air pipe 50. The fluid under pressure in pipe 72 is supplied from two sources, first from the feed valve pipe 55 by way of check valve 48, and second, from a pipe 75 by way of check valve 59 from the distributing valve 1. A spring 76 is provided which acts on the application valve 71 to seat same upon deenergization of the magnet 69 for thus cutting off the supply of fluid under pressure to the straight air pipe.

The release magnet 70 is provided for seating a release valve 73 upon energization of the magnet 70 so as to close communication between the straight air pipe 50 and an atmospheric release port 77. A spring 78 acting on the valve 73 is provided for unseating said valve to open the release communication upon deenergization of the magnet 70.

The double check valve 46 contains a movable piston 165 arranged to control communication between the application cylinder pipe 13 and either a pipe 79 opening to one end of said check valve or a pipe 80 opening at the opposite end. In the position shown in the drawing, Fig. 1, the pipe 13 is disconnected from pipe 79 and connected to pipe 80. Upon movement of the movable piston 165 to its opposite position pipe 13 is disconnected from pipe 80 and connected to pipe 79.

The double check valve 47 is similar to the check valve 46, except the movable piston 161 in this check valve is subject on one side to the combined pressures of fluid in a chamber and a biasing spring 81 and subject on the other side to pressure of fluid in a chamber. This check valve is provided to control communication between the distributing valve release pipe 12 and either the pipe 79 opening at one end of said check valve or a pipe 82 opening at the opposite end. The purpose of and mode of operation of these check valve devices will be described in the description of operation of the equipment.

The foot valve 53 is operative to give independent control of locomotive brakes during a straight air brake application. This foot valve may comprise a casing having a chamber 85 open to the pipe 79 and containing double seating valves 86 and 87 which are subject to the pressure of a spring 88 contained in a chamber 89 which is connected to the control pipe 54 leading to the straight air brake valve device 42 and the master switch 43. The valve 86 is adapted to control communication from chamber 85 to the atmosphere by way of a release port 90 and valve 87 controls communication between chamber 89 and the chamber 85 of the foot valve 53. The valves 86 and 87 are adapted to be operated by a plunger 91 slidably mounted in the casing and operatively manually through the medium of a foot button 92.

LOCOMOTIVE TENDER EQUIPMENT

Considering now the portion of the equipment for the locomotive tender, as shown to the left in Fig. 1A, this includes one or more brake cylinders 93. The control of fluid under pressure to and the release from the brake cylinder is effected through the brake cylinder pipe 11, which is adapted to be connected to the brake cylinder pipe on the locomotive.

Also on the tender is a straight air pipe 50 and a brake pipe 10 which extend through the tender and are adapted to be connected at one end to the straight air pipe and to the brake pipe on the locomotive and at the other end to the straight air pipe and to the brake pipe on the first car. In addition to these pipes, the application and release wires 51 and 52 extend through the tender from the locomotive to the first car.

CAR EQUIPMENT

Considering now the car equipment as shown to the right in Fig. 1A, this brake equipment is now known to those skilled in the art as the high speed brake equipment with speed governor control. It is illustrated and described in commercial form in Instruction Pamphlet No. 5064, sup. 7 (November, 1937), published by The Westinghouse Air Brake Company, Pittsburgh, Pa. The essentials of this equipment are also substantially described and claimed in the U. S. Patent No. 2,140,624, of E. E. Hewitt, for Speed controlled brake, issued December 20, 1938, and assigned to The Westinghouse Air Brake Company. The car equipment as illustrated to the right in Fig. 1A of the drawings comprises a straight air brake system and an automatic brake system. This includes the straight air pipe 50, the brake pipe 10 and the application and release wires 51 and 52, respectively, which extend throughout the train. In addition, it includes one or more brake cylinders 94 and a control valve device 96 of the type comprising a relay valve portion and a magnet valve portion which is adapted to control the brake cylinder pressure according to the speed of travel of the car or train. A speed governor or speed responsive switch 98 for controlling the magnet valve devices of the control valve device 96 and a pneumatic switch 99 for controlling the supply of electrical energy from a storage battery indicated at 105 to said governor, are also provided. The equipment also includes an application and release magnet valve device 97, which is connected to the straight air pipe 10, and is for controlling the supply to and the release of fluid under pressure to the control valve 96 during a straight air application of the brakes. The parts of the car equipment as just enumerated are fully described and claimed in the patent to E. E. Hewitt, No. 2,140,624, above referred to.

For controlling the supply to and the release of fluid under pressure to the control valve 96 during an automatic brake application, a "K" triple valve 95 of well known construction is provided, but the valve may be of any other type such as shown in Instruction Pamphlet No. 5064-7 hereinbefore referred to.

The various reservoirs on the car comprise a supply reservoir 101, which provides the source of fluid under pressure for the brake cylinder when effecting an application of the brakes, a volume reservoir 102, which functions to limit the degree of automatic application, and an auxiliary reservoir 100, which provides the source of fluid under pressure for operation of the control valve 96 during an automatic application of the brakes.

Also on the car is a charging pipe 106 connected to the brake pipe 10 which, as illustrated, leads to the control valve 96 and to the supply reservoir 101, and serves to maintain the supply reservoir charged to the pressure of fluid in the brake pipe by way of a choke 110 and one way check 104. Extending from the triple valve 95 to one side of a double check valve device 107, which is of the usual construction, is a pipe 108 and extending from the straight air pipe to the opposite end of the check valve 107 is a pipe 109 which are provided to control brake applications as will hereinafter more fully appear.

Considering now more in detail the devices above described briefly. The "K" triple valve 95, which is operated during an automatic brake application in the well known manner as fully described in Westinghouse Air Brake Company's Instruction Pamphlet No. 5035, operates upon a reduction in the pressure of fluid in the brake pipe 10 to supply fluid under pressure from the auxiliary reservoir 100 to the control valve 96 for effecting the supply of fluid to and the release of fluid from the brake cylinder 94.

The application and release magnet valve device 97 is the same as the application and release magnet valve device 44 described hereinbefore in connection with the locomotive straight air brake equipment. This device function during straight air operation of the brakes to control the supply of fluid from the auxiliary reservoir 100 to the control valve device 96 for effecting the supply of fluid to and the release of fluid from the brake cylinder 94.

The double check valve 107 is of usual construction arranged to control communication between a pipe 103 leading to the control valve device 96 and either the pipe 108 opening to one end of the check valve and leading to triple valve device 95 or the pipe 109 opening at the opposite end of the check valve and leading to the straight air pipe and magnet valve 97.

The control valve device 96 and the speed governor 98 are substantially the same as those disclosed in Patent No. 2,140,624, issued to E. E. Hewitt, on December 20, 1938. A detailed description of the construction and operation of the device is however not essential to a clear understanding of the invention, and it is therefore elected to describe only the functions of the device which are essential to an understanding of the operation.

The control valve device 96 as hereinbefore mentioned comprises a relay valve portion and a magnet valve portion. Contained in the relay valve portion there is a chamber which is constantly supplied with fluid under pressure from the supply reservoir by way of pipe 175. Also contained in this portion is a chamber open to a pipe 112 connected to the brake cylinder 94.

For the purpose of controlling communication between the supply pipe 175 and the pipe 112 leading to the brake cylinder 94 and for controlling communication from the brake cylinder to the atmosphere by way of pipe 112, an application and release valve mechanism is provided. The operation of this valve mechanism is effected by variations in the pressure of fluid acting on a series of connected diaphragms, of successively decreasing pressure areas.

The magnet valve portion of the control valve device comprises a plurality of magnet valve devices which are provided for controlling communication between the control pipe 103 and chambers adjacent the series of connected diaphragms. The magnet valve devices are energized or deenergized automatically according to the speed of the car or train and through the medium of the connected diaphragms, control the pressure supplied to the valve mechanism, and thus to the brake cylinder, in a series of steps as the speed of the car or train reduces in being brought to a stop.

The speed responsive governor 98 operates to control energization and deenergization of the magnet valve devices of the control device 96. This governor is a centrifugally operated device adapted to actuate a switch portion which controls circuits to said magnet valves in accordance with the speed zone at which the car or train is traveling.

The pneumatic switch device 99 may be of any suitable construction and is illustrated as comprising a casing 115 containing a piston 116 having a stem 117 carrying in insulated relation thereon a movable contact member 118 for connecting in bridging relation a pair of stationary contact fingers 119. At one side of the piston 116 is a chamber 120 which is connected to and supplied with fluid under pressure from a pipe 125 which is connected to the straight air pipe 50. At the opposite side of the piston is a chamber 121, containing a spring 122 which is interposed between the wall of the casing 115 and the piston 116 and which yieldingly urges the piston downwardly to effect separation of the movable contact member 118 from the stationary contact fingers 119. When fluid under pressure is supplied to the chamber 120, the tension of the spring 122 is overcome and the piston 116 is moved to actuate the contact member 118 into circuit closing engagement with the contact finger 119. The tension of the biasing spring 122 is relatively light so that the contact member 118 engages the contact finger 119 in response to a relatively low pressure in chamber 120, such as one or two pounds per square inch.

OPERATION

*Charging of the locomotive equipment*

Assuming the main reservoir is charged with fluid under pressure the equipment illustrated in Fig. 1 will be charged as follows:

In charging the equipment the handle of the straight air brake valve device 42 will be held in release position. The control pipe 54 will thus be maintained open to the atmosphere while a branch pipe 148 from the main reservoir pipe 6 will be charged with fluid at main reservoir pressure.

With the control pipe 54 vented, the parts of the master switch device 43 will be in the position shown in which both the application and release train wires 51 and 52 and therefore the application and release magnet valve devices 69 and 70, respectively, will be deenergized. The straight air pipe 50 will then be vented past the release valve 78 in the release magnet valve device 70 to the atmosphere.

The foot valve 53 will be in the position shown on the drawing and since control pipe 54 is vented the pipe 79 connected to one outlet of each of the double check valves 46 and 47 respectively will be vented by way of chamber 85, past unseated valve 87, and chamber 89 in the foot valve 53.

From the feed valve device 7 fluid under pressure will flow to the application magnet valve 71 by way of feed valve pipes 8 and branch pipe 55, choke 150, one way check valve 48 and pipe 72.

The handle of the independent brake valve device 3 will be in running position as shown on Fig. 1 of the drawings, and fluid under pressure as regulated by the reducing valve 9 is supplied from the main reservoir 5 to the rotary valve chamber 36 of the independent brake valve device 3, by way of branch pipe 151 from the main reservoir pipe 148. In this position the rotary valve 37 of the independent brake valve laps the connection from chamber 36 to pipe 80, which is connected to the check valve 46, and connects the pipe 82 leading from the check valve 47 to a pipe 136 by way of a cavity 135.

With the independent brake valve device 3 in running position and the straight air brake valve device 42 in release position, the brake pipe 10 is initially charged with fluid under pressure in the following manner. By placing the operating handle of the automatic brake valve device 2 in release position, fluid under pressure from the main reservoir 5 is supplied directly to the brake pipe 10 through pipe 6, through the automatic brake valve 2, a branch pipe 126, to accelerate the charging of the brake pipe 10. Then, after a certain time has elapsed, the handle of the automatic brake valve device is turned to running position. Fluid under pressure is then supplied from the main reservoir 5 to the brake pipe 10 through pipe 6, feed valve 7, pipe 8, through the automatic brake valve device 2, and branch pipe 126.

Fluid under pressure is supplied from the brake pipe 10, through the branch pipe and passage 15 to the equalizing piston chamber 14 of the distributing valve device 1. The pressure of fluid in chamber 14, acting on piston 16, causes the piston to be moved to release position, as shown in Fig. 1. In this position feed groove 127 around the piston 16 is uncovered and fluid at brake pipe pressure is then supplied from the equalizing piston chamber 14 through the feed groove 127 to the slide valve chamber 20. From the slide valve chamber 20 fluid under pressure flows to the pressure chamber 74 through the passage 128.

From the pressure chamber 74 fluid under pressure will flow through the pipe 75 to the chamber below application valve 71 of the application magnet 69 by way of choke 152, one way check valve 49 and pipe 72.

In the release position of the equalizing main slide valve 18 and auxiliary slide valve 19, the application piston chamber 22 and an application chamber 129, provided for enlarging the capacity of the application piston chamber, are connected together through passages 159 and 130, a port 131 opening out of passage 130 at the seat of main slide valve 18, a cavity 132 in the main slide valve, and a passage 133. Also, with the automatic brake valve device 2 in running position, both the application piston chamber 22 and the application chamber 129 are connected to atmosphere. The connection is made by way of passage 134 opening at the seat of the main slide valve 18 and in communication with the cavity 132 in the slide valve, and release pipe 12 which is connected to the check valve device 47 which as shown in Fig. 1 of the drawings now communicates with the pipe and passage 82. This pipe and passage, as before mentioned, is connected to pipe 136 through the independent brake valve 3, which pipe communicates with a passage 137, a cavity 138 and an atmospheric port 139 in the automatic brake valve device 2.

In the release position of the application piston 21, the locomotive and tender brake cylinders 4 and 93 are vented to atmosphere, through pipes 11 and 24, a branch passage 141 opening into valve chamber 25, and an atmospheric passage 142 leading out of the valve chamber 25 and controlled by the exhaust slide valve 28.

From the main reservoir fluid under pressure will also flow to the supply chamber 32 of the distributing valve 1 by way of main reservoir pipes 6, 148 and branch pipe 149.

From the brake pipe 10 fluid under pressure will also flow to the straight air brake valve 42 by way of branch pipe 143.

*Charging of the car equipment*

Fluid under pressure supplied to the brake pipe on the locomotive will flow to the brake pipe on each car throughout the train. From the brake pipe 10 of the car, as illustrated in Fig. 1A, fluid under pressure will flow to the supply reservoir 101 and to the supply valve of the control valve 96 by way of pipe 106, through choke 110 and one way check valve device 104.

Fluid under pressure is supplied from the brake pipe 10, through branch pipe 145 to the "K" triple valve device 95, to charge the auxiliary reservoir 100. The triple valve device 95 operates in the usual manner in its release position to vent the brake cylinder control pipe 108 and the connected volume reservoir 102.

The application and release wires 51 and 52 and therefore the application and release magnets of the magnet valve device 97 are deenergized, so that the straight air pipe 50 and connected branch pipes 109 and 162 will be vented. Therefore the control pipe 103 leading to the control valve device 96 may be vented by way of either of the circuits just traced depending upon the position of the check valve device 107.

With the control pipe 103 vented the control valve device 96 will be in its release position, thus connecting the brake cylinder 94 to the atmosphere by way of pipe 112.

With the straight air pipe 50 vented the branch pipe 125 leading to the pneumatic switch 99 will be vented and the switch will assume the position shown on Fig. 1A of the drawings. In this position of the switch 99 the supply of electrical energy from the battery 105 to the speed responsive governor 98 will be cut off so that all magnet valves of the magnet portion of the control valve device 96 will remain deenergized.

*Automatic service application*

Upon a reduction in brake pipe pressure at a service rate, effected in the usual manner by means of the automatic brake valve device 2, and with the independent brake valve device in running position as above described and the straight air brake valve 42 in release position thereof, the distributing valve on the locomotive and the "K" triple valves on each car operates to effect an application of the brakes in the usual manner.

The equalizing piston 16 and valve devices 18 and 19 of the distributing valve device 1 move out to service position upon a predetermined reduction in brake pipe pressure in chamber 14. Fluid under pressure is supplied from the pressure chamber 74 and slide valve chamber 20 to the application piston chamber 22 through a service port 153 in the main slide valve 18 and passages 130 and 159. From passage 130 fluid also flows to the application chamber 129 through a cavity 154 in the main slide valve 18.

Thus the pressure of fluid in application piston chamber 22 is gradually increased, and the application piston and the slide valve devices 28 and 31 are moved out to service position, wherein exhaust valve 28 cuts off communication from brake cylinders 4 and 11 to atmosphere through passage 142, and the application slide valve 31 establishes communication between the application slide valve chamber 32 and the valve chamber 25. Fluid under pressure is then supplied from chamber 25 and the main reservoir 6 to the brake cylinders 4 and 11, to effect a service application of the brakes on the locomotive and tender. The communication to the brake cylinder is established through pipes 6, 148, branch pipe 149, chamber 32, port 155, in the supply valve, valve chamber 25, passage 141, pipe 24 to the locomotive brake cylinder 4 and by connected pipe 11 through choke 156 to the tender brake cylinder 93.

When the application piston 21 is moved to the right the spring 157 in the piston stem 26 is compressed due to the spring plunger 146 engaging the adjacent end wall of slide valve chamber 25.

When the further supply of fluid under pressure to the application piston chamber 22 and the application chamber 129 is cut off at the seat of the auxiliary slide valve 18, upon a reduction of pressure of the fluid in pressure chamber 74 and slide valve chamber 20 below that in the equalizing piston chamber 14, and the consequent movement of the equalizing piston and slide valve device to lap position, the further increase in pressure in the application piston chamber 22 ceases.

When the pressure in chamber 27 at the right of the application piston 21 has been increased in accordance with the increase in brake cylinder pressure, to a degree slightly exceeding the pressure in the application piston chamber 22, the piston 31 is shifted to lap position by the graduating spring 157. The brakes are thus held applied on the locomotive and tender to the attained degree of brake cylinder pressure.

Upon a service reduction in brake pipe pressure, the triple valve 95 on the car responds in the usual manner and supplies fluid under pressure from the auxiliary reservoir 100 to both the control valve device 96 and to the volume reservoir 102, which are connected in parallel. The control valve effects a supply of fluid under pressure to the brake cylinder 94 as fully described in Patent 2,140,624, of E. E. Hewitt, issued December 20, 1938.

The purpose of the volume reservoir 102 is to limit the pressure which may be developed in the brake cylinder during an automatic service application. The speed responsive governor device 98 and the magnet portion of the control valve device 96 are inoperative to vary the supply pressure to the brake cylinder during an automatic service application. Therefore it is desirable in order to avoid wheel sliding to limit the degree of brake cylinder pressure to a moderate value.

*Release after automatic service application*

If it is desired to release the brakes on the train after an automatic service application of the brakes, the operating handle of the automatic brake valve device 2 may be turned first to release position where it is held momentarily to accelerate the charging of the brake pipe, and then to running position. Inasmuch as the brake equipments on the cars and the locomotive operate in the usual manner to effect a release of the brakes on the cars and on the locomotive, it is deemed unnecessary to specifically describe the operation of the equipment for this type of release of the brakes. However, it might be mentioned briefly that the release of fluid from the application piston chamber 22 and the application chamber 129 is by way of the distributing valve release pipe 12 to the normally connected pipe 82 by way of check valve 47, and then through the independent brake valve 3 and the automatic brake valve 2 to the atmosphere, as before described.

*Straight air or electro-pneumatic service application of the brakes*

When it is desired to effect a normal service application of the brakes by straight air operation, the handle 35 of the automatic brake valve device 2 and the handle of the independent brake valve device 3 are maintained in their normal running position, while at the same time the handle 56 of the straight air brake valve 42 is then moved into the service application zone to a degree or extent according to the desired degree of application of the brakes.

The straight air brake valve is provided with a self-lapping mechanism of the usual type which responds to this movement of the brake valve handle to establish in the control pipe 54 fluid at a pressure corresponding to the degree or extent of movement of the brake valve handle into the service application zone. The fluid under pressure established in the control pipe 54 flows to chamber 60 of the master switch device 43 and to the application piston chamber 22 and the application chamber 129 of the distributing valve device 1.

The communication to chamber 22 is through pipe 54, chamber 89 of the foot valve 53, past unseated valve 87 to chamber 85, pipe 79 and a chamber 150 of the double check valve device 46. The pressure of fluid in chamber 158 acting on the movable piston 165 of the check valve 46 causes the piston to move to a position opposite to that shown on the drawing and in so doing connects pipe 79 with pipe 13 and disconnects pipes 13 and 80. Thus communication is established by way of pipe 13 and passage 130 and 159 to the application piston chamber 22 and from passage 130, cavity 132 in the slide valve 18, passage 133 to the application chamber 129 of the distributing valve device 1. Fluid under pressure in pipe 79 also flows to a chamber 160 of the double check valve 47. The pressure of fluid acting in chamber 160 overcomes the opposing force of spring 81 acting on the opposite side of movable piston 161, thus causing said piston to move to its opposite position and thereby connects pipe 79 to pipe 12 and disconnects pipe 12 from pipe 82, which is connected to the atmosphere by the automatic brake valve device in running position, as described under charging of the equipment. With the connection between pipes 12 and 82 closed, fluid under pressure in the application piston chamber 22 and the application chamber 129 of the distributing valve device 1 is closed to the independent and automatic brake valve devices 3 and 2 respectively. Thus the check valve 47 will operate during a straight air application of the brakes to prevent release of the locomotive brakes by manipulation of the automatic and independent brake valves.

Thus the pressure of fluid in application piston chamber 22 is gradually increased and the application piston 21 and attached slide valves 28 and 31 operate as described under automatic application of the brakes to effect an application of the locomotive and tender brakes.

During this straight air application of the brakes the equalizing piston 16 of the distributing valve device is maintained in release position, as shown in Fig. 1 of the drawings, since the pressure of fluid in the brake pipe and consequently in chamber 14 is maintained at feed valve pressure by supply of fluid from the feed valve 7 through the automatic brake valve device 2 to the brake pipe 1.

The pressure of fluid supplied to the chamber 60 in the master switch device 43 effects movement of the diaphragms 57 and 58 and thereby the contact 66 toward the right hand into engagement with fingers 67 and 68, thereby supplying electrical current from the battery 45 first to the release train wire 52 and then the application train wire 51. The release magnet 78 on the locomotive is consequently energized and seats valve 78 to close communication between the straight air pipe 50 and atmospheric exhaust port 77, following which the application magnet 67 is energized and acts to open the valve 71.

With the valve 71 unseated, fluid under pressure flows from the feed valve 7 and from the pressure chamber 74 of the distributing valve 1 to the straight air pipe 50. The flow of fluid from the feed valve 7 is through pipe 55, choke 150, one way check valve 45, pipe 72, past unseated valve 71 to the straight air pipe 50. Fluid under pressure supplied to the straight air pipe 50 from the pressure chamber 74 flows by way of pipe 75, through choke 152, one way check valve device 49 to pipe 72 and from thence to the straight air pipe as above described. Fluid under pressure thus supplied from the pressure chamber 74 and connected slide valve chamber 20 insures that the equalizing piston 16 and the connected valves 18 and 19 will not unintentionally move from release position due to fluctuation in brake pipe pressure during a straight air application of the brakes.

Fluid under pressure supplied to the straight air pipe on the locomotive flows through the choked passage 63 into diaphragm chamber 61 in the master switch device 43 and also to the branch pipes 125 on the car, as illustrated in Fig. 1A, the purpose of which will presently be disclosed.

Upon the supply of current to the application and release wires 51 and 52 respectively the magnet valve device 97 on the car is operated in a manner similar to the magnet valve device 44 on the locomotive. That is, the release magnet valve 170 functions to close communication between the straight air pipe and the atmosphere, following which the application magnet valve 171 acts to open communication from the auxiliary reservoir 100 to said pipe.

Fluid under pressure flows from the auxiliary reservoir 100 to the straight air pipe 50 by way of pipe 147, through the application magnet valve device 171 and branch pipe 162.

Fluid under pressure supplied from the straight air pipe 50 to branch pipe 125 flows to the chamber 120 of the pneumatic switch 99 and effects the actuation of the movable contact 118 into engagement with the contact fingers 119, thereby supplying electrical current from the battery 105 to the speed responsive governor 98.

The speed responsive governor controls the supply of current to the electromagnet windings of the magnet valve devices 172, 173 and 174 of the control valve 96 in accordance with the speed at which the car or train is traveling when the brake application is initiated.

Fluid at straight air pipe pressure flows to the control valve device 96 by way of pipe 109, double check valve device 107 and pipe 103. The control valve device 96 then functions as fully described in the aforementioned Patent No. 2,140,624, of E. E. Hewitt, to supply fluid under pressure from the supply reservoir 101 to the brake cylinder 94. The communication is made by way of pipes 175 and 106, through the control valve 96 and pipe 112.

When the pressure of fluid supplied to the straight air pipe 50, and diaphragm chamber 61 in the master switch 43 has attained a degree sufficient to overcome the control pressure supplied to chamber 60, the diaphragm is operated to move the contact 66 out of engagement with the finger 68 for thereby effecting deenergization of the application train wire 51. The application magnets 69 and 171 are consequently deenergized and the supply valve in each closes, cutting off further flow of fluid under pressure to the straight air pipe 50. By thus preventing a further increase in pressure in the straight air pipe and diaphragm chamber 61 of the master switch device 43, further movement of the diaphragm 57 to the left is arrested before contact 66 is disengaged from the release finger 67. The master switch 43 thus operates to limit the pressure obtained in the straight air pipe 50 and thus supplied to the control valve device 96 to a degree which is substantially equal to that supplied to the service control pipe 54 as governed by the position of the brake valve handle 56.

The control valve device 96 functions automatically as the speed of the car or train reduces due to the application of the brakes, to reduce the pressure in the brake cylinder or cylinders in a series of steps, without necessitating any change by the operator of the pressure in the control pipe 54.

If the handle 56 of the brake valve device 42 is moved further into the application zone away from the release position, a corresponding increase in pressure in the service control pipe 54 is effected. The master switch device 43 then operates to effect a corresponding increase in pressure in the straight air pipe and the distributing valve device 1 in turn reproduces in the locomotive brake cylinder 4 and the tender brake cylinder 93 a like increase in pressure. The control valve 96 on the car also operates to supply fluid under pressure from the supply reservoir 101 to correspondingly increase the pressure in the brake cylinder 94.

*Release after a straight air service application*

To release the brakes following a straight air service application, the brake valve handle 56 is returned to release position, whereupon the control pipe 54 will be vented to the atmosphere resulting in operation of the master switch device 43, the application and release magnet valve devices 44 and 97, the distributing valve device 1 on the locomotive and the control valve 96 on the car, to release brake cylinder pressure.

*Independent release of locomotive brakes after an automatic service application of the train brakes*

After the train brakes are applied by a service reduction in brake pipe pressure, the operator may desire to release the brakes on the locomotive independently of those on the train, in order to avoid overheating of the driver wheels. This independent release of locomotive brakes is accomplished by moving the handle 38 of the independent brake valve device 3 to release position, as shown in Fig. 2 of the drawings. In this position the rotary valve 37 of the independent brake valve laps the connection between pipes 82 and 136, thus cutting off the connection between the automatic brake valve 2 and the distributing valve device 1. At the same time the rotary valve 37 connects the pipe 80 leading from the check valve 46 to an atmospheric port 180 in the seat of rotary valve 37 by way of a cavity 181. As a result of this operation fluid under pressure in the application piston chamber 22 and the application chamber 129 is vented to the atmosphere, by way of passages 159 and 130, pipe 13, double check valve 46, pipe 80, cavity 181 and atmospheric port 180.

Thus the pressure of fluid in the brake cylinder acting in chamber 23 on the opposite side of the application piston 21 moves the application piston 21 and attached slide valves 28 and 31 to release position as shown in Fig. 1 of the drawings, and engine and tender brakes are released by the distributing valve device.

During this independent release of the locomotive and tender brakes there is no change in the fluid acting in the brake pipe and consequently in the equalizing piston chamber 14 or in the pressure chamber 74 and connected slide valve chamber 20, so that the equalizing piston 16 does not move.

If it is desired to reapply the locomotive brakes after effecting an independent release thereof, the handle 38 of the independent brake valve device 3 is moved to application position. In this position fluid under pressure in chamber 36 at reducing valve pressure is supplied to pipe 80. Fluid under pressure in pipe 80 flows therefrom by way of double check valve 46, pipe 13 and passages 130 and 159 to the application piston chamber 22 and application chamber 129 of the distributing valve device 1 to effect reapplication of the locomotive and tender brakes.

*Independent release of locomotive brakes on the locomotive after an electro-pneumatic straight air application of the train brakes*

According to the invention, the foot valve devices 53 and the double check valve devices 46 and 47 respectively provide the interlock between the straight air and the automatic brake system whereby the locomotive brakes may be independently released after a straight air application of the train brakes.

If after the train brakes are applied by an electro-pneumatic straight air application, the operator desires to release the brakes on the locomotive without effecting a release of the brakes on the other vehicles in the train, for reasons before described, this may be accomplished by depressing the plunger 92 of the foot valve 53 and moving the handle 38 of the independent brake valve device 3 to release position. As a result of this operation, the valve 87 in the foot valve 53 is seated, thus cutting off communication between the straight air brake valve 42 and the distributing valve device 1. This is accomplished by closing the communication between the control pipe 54 and pipe 79 leading to the double check valve devices 46 and 47. At the same time the valve 86 in the foot valve 53 is unseated, thus venting pipe 79 to the atmosphere by way of atmospheric port 90 in the foot valve 53.

Establishing of the communication from pipe 79 to the atmosphere by the circuit just traced vents fluid under pressure from the chambers 158 and 160 of the check valve devices 46 and 47 respectively, thus causing the movable pistons 161 and 165 of said check valve to move to the position in which they are shown in Fig. 1 of the drawings.

With the handle 38 of the independent brake valve 3 in release position communication between pipe 80 and the atmosphere is established by way of cavity 181 in the rotary valve and exhaust port 180 in the seat, as shown in Fig. 2 of the drawings and as before described under independent release of locomotive brakes after an automatic application. With this communication established fluid under pressure in the application piston chamber 22 and the application chamber 129 of the distributing valve device 1 is vented to atmosphere. The flow of fluid from said chambers to the atmosphere is by way of passages 159 and 130, pipe 13, through check valve 46, pipe 80, cavity 181 and port 180.

Upon the reduction of pressure in these chambers the distributing valve device 1 functions as before described to effect a release of the locomotive brakes.

If it is desired to reapply the locomotive brakes after effecting an independent release thereof the handle 38 of the independent brake valve device 3 is moved back to running position thereof, and the operator removes his foot from the plunger 92 of the foot valve 53. This operation unseats valve 87 thus opening communication from the control pipe 54 to the pipe 79. At the same time valve 86 in the foot valve 53 closes the communication between the pipe 79 and the atmosphere. With the handle of the independent brake valve 3 in running position communication between pipe 80 and the atmosphere is closed as shown in Fig. 1 of the drawings. Fluid under pressure in the control pipe 54 flows past the unseated valve 87 of the foot valve 53 to pipe 79. The pressure of the fluid in pipe 79 acting on the movable pistons 165 and 161 of the double check valves 46 and 47 respectively causes them to move toward the left hand. Thus fluid under pressure flows from pipe 79 to pipes 12 and 13 to effect a reapplication of the brakes on the locomotive without further manipulation of the straight air brake valve 42.

From the foregoing description it will be evident that the invention provides for flexible control of the brakes on the locomotive and on a train equipped with any type of passenger or freight brake equipment now in use, and at the same time provides for flexible control of the brakes on the locomotive independently of those on the train, so that the locomotive may be adjusted regardless of the train, to all conditions under which it may operate.

While one illustrative embodiment of my invention has been described in detail, it is not my intention to limit its scope to this embodiment or otherwise than by the terms of the appended claims.

Having now described my invention, what I claim as new and desire to secure by Letters Patent, is:

1. In a fluid pressure brake system for a train comprising a locomotive and one or more cars, in combination, an automatic brake valve device, an independent brake valve device, a straight air brake valve device, means controlled by either the automatic brake valve device or the straight air brake valve device for effecting an application of the brakes on the locomotive and on the cars, means whereby a release of the brakes on the locomotive only can be effected by the independent brake valve device alone when the train brake application has been effected by the automatic brake valve device, and means operative separate from but jointly with the independent brake valve device for effecting a release of the brakes on the locomotive only when the train brake application has been effected by the straight air brake valve.

2. In a fluid pressure brake system for a train comprising a locomotive and one or more cars, in combination, an automatic brake valve device, an independent brake valve device, a straight air brake valve device, means controlled by either the automatic brake valve device or the straight air brake valve device for effecting an application of the brakes on the locomotive and on the cars, means whereby a release of the brakes on the locomotive only can be effected by the independent brake valve device alone when the train brake application has been effected by the automatic brake valve device, and means for effecting a release of the locomotive brakes only when the train brake application has been effected by the straight air brake valve and being effective only when the independent brake valve is in a certain position.

3. In a fluid pressure brake system for a train comprising a locomotive and one or more cars, in combination, a first control pipe in which the pressure of fluid is varied to control application and release of the locomotive brakes only, a second control pipe in which the pressure of fluid is varied to control application and release of the car brakes only, a first brake valve means for varying the pressure of fluid in said first pipe, a second brake valve means for varying the pressure of fluid in said second pipe, and valve means operative by the pressure of fluid in said second pipe for connecting said second pipe to and isolating said first brake valve means from said first pipe.

4. In a fluid pressure brake system for a train comprising a locomotive and one or more cars, in combination, a first control pipe in which the pressure of fluid is varied to control application and release of the locomotive brakes only, a second control pipe in which the pressure of fluid is varied to control application and release of the car brakes only, a first brake valve means for varying the pressure of fluid in said first pipe, a second brake valve means for varying the pressure of fluid in said second pipe, and a check valve device operative by the pressure of fluid in said second pipe for connecting said second pipe to said first pipe and for isolating said first brake valve from said first pipe.

5. In a fluid pressure brake system for a train comprising a locomotive and one or more cars, in combination, an automatic brake valve device, an independent brake valve device, a straight air brake valve device, means controlled by either the automatic brake valve device or the straight air brake valve device for effecting an application of the brakes on the locomotive and on the cars, means whereby a release of the brakes on the locomotive only can be effected by the independent brake valve device alone when the train brake application has been effected by the automatic brake valve device, and means operative when the train brake application has been effected by the straight air brake valve device for rendering the independent brake valve device ineffective to release the locomotive brakes.

6. In a fluid pressure brake system for a train comprising a locomotive and one or more cars, in combination, an automatic brake valve device, an independent brake valve device, a straight air brake valve device, means controlled by either the automatic brake valve device or the straight air brake valve device for effecting an application of the brakes on the locomotive and on the cars, means whereby a release of the brakes on the locomotive only can be effected by the independent brake valve device alone when the train brake application has been effected by the automatic brake valve device, said release of the locomotive brakes being accomplished by release of fluid under pressure through a communication passing through the independent brake valve, and a valve device operative responsive to operation of the straight air brake valve device for closing said communication.

7. In a fluid pressure brake system, in combination, an application pipe to which fluid under pressure is supplied to effect an application of the brakes and from which fluid under pressure is released to effect a release of the brakes, a first brake valve device for supplying fluid under pressure to and for releasing it from said application pipe, a second brake valve device for also supplying fluid under pressure to and for releasing it from said application pipe, and a valve device operative by the pressure of fluid supplied by one of said two brake valve devices for opening communication from that brake valve device to said application pipe and for closing communication from the other brake valve device to the application pipe.

8. In a brake system for a train comprising a locomotive and one or more cars, in combination, pneumatically controlled means for controlling application and release of the brakes on the locomotive, electropneumatically controlled means for controlling application and release of the brakes on the cars, brake valve means for controlling operation of the electropneumatically controlled means, and a manually operated valve device having one position for subjecting said pneumatically controlled means to control by said brake valve means and a different position for isolating said pneumatically controlled means from said brake valve means.

9. In a fluid pressure brake system, in combination, a valve device having an application piston chamber to which fluid under pressure is supplied to effect an application of the brakes and from which fluid under pressure is released to effect a release of the brakes, automatic valve means operable upon a reduction of pressure therein for effecting a supply of fluid under pressure to said chamber, an independent brake valve device for supplying fluid under pressure to and for releasing it from said chamber, a self-lapping straight air brake valve device for also supplying fluid under pressure to and for releasing it from said chamber, means whereby a release of fluid in said chamber can be effected by the independent brake valve device alone when the supply to said chamber has been effected by said automatic valve means, and means operative separate from but jointly with the independent brake valve device for effecting release of fluid under pressure from said chamber when the brake application has been effected by the straight air brake valve device.

10. In a fluid pressure brake system for a train comprising a locomotive and one or more cars, in combination, an automatic brake valve device, an independent brake valve device, a self-lapping straight air brake valve device, means controlled by either the automatic brake valve device upon a reduction in pressure or by the straight air brake valve device upon an increase in pressure for effecting an application of the brakes on the locomotive and the cars, means whereby a release of the brakes on the locomotive only can be effected by the independent brake valve device alone when the train brake application has been effected by the automatic brake valve device, and a valve device operative separate from but jointly with the independent brake valve device for effecting a release of the brakes on the locomotive only when the train brake application has been effected by the straight air brake valve device, said valve device having two positions and being operative in one position to permit and operative in the other to prevent a release of the locomotive brakes by said independent brake valve device.

11. In a fluid pressure brake system for a train comprising a locomotive and one or more cars, in combination, an automatic brake valve device, an independent brake valve device, a self-lapping straight air brake valve device, means controlled by either the automatic brake valve device upon a reduction in pressure or by the straight air brake valve device upon an increase in pressure for effecting an application of the brakes on the locomotive and the cars, means whereby a release of the brakes on the locomotive only can be effected by the independent brake valve device alone when the train brake application has been effected by the automatic brake valve device, and means including a foot valve device for effecting in one position a release of the locomotive brakes only when the train brake application has ben effected by the straight air brake valve device and being effective in this position only when the independent brake valve device is in release position.

12. In a fluid pressure brake system for a train comprising a locomotive and one or more cars, in combination, a normally discharged control pipe in which the pressure of fluid is varied to control application and release of the locomotive brakes only, a normally discharged straight air control pipe in which the pressure of fluid is varied to control application and release of the car brakes only, an independent brake valve device having a normal position and movable therefrom for varying the pressure of fluid in said first pipe, a self-lapping straight air brake valve device for varying the pressure of fluid in said second pipe in accordance with the position of the handle of said valve device in an application and release zone, and valve means operative by the pressure of fluid in said second pipe for connecting said second pipe to and isolating said first brake valve device from said first pipe.

13. In a fluid pressure brake system for a train comprising a locomotive and one or more cars, in combination, a normally discharged control pipe in which the pressure of fluid is varied to control application and release of the locomotive brakes only, a normally discharged straight air control pipe in which the pressure of fluid is varied to control application and release of the car brakes only, an independent brake valve device having a normal position and movable therefrom for varying the pressure of fluid in said first pipe, a self-lapping straight air brake valve device for varying the pressure of fluid in said second pipe in accordance with the position of the handle of said valve device in an application and release zone, and means for effecting a release of the locomotive brakes only when the train brake application has been effected by the straight air brake valve and being effective only when the independent brake valve device is in a certain position.

14. In a fluid pressure brake system for a train comprising a locomotive and one or more cars, in combination, a normally discharged control pipe in which the pressure of fluid is varied to control application and release of the locomotive brakes only, a normally discharged straight air control pipe in which the pressure of fluid is varied to control application and release of the car brakes only, an independent brake valve device having a normal position and movable therefrom for varying the pressure of fluid in said first pipe, a self-lapping straight air brake valve device for varying the pressure of fluid in said second pipe in accordance with the position of the handle of said valve device in an application and release zone, and a check valve device operative when the train brake application has been effected by the straight air brake valve device for rendering the independent brake valve device ineffective to release the locomotive brakes.

15. In a fluid pressure brake system, in combination, a valve device having an application piston chamber to which fluid under pressure is supplied to effect an application of the brakes and from which fluid under pressure is released to effect a release of the brakes, a straight air self-lapping brake valve device for supplying fluid under pressure to and for releasing it from said chamber, an independent brake valve device for also supplying fluid under pressure to and for releasing it from said chamber, and a check valve device operative by the pressure of fluid supplied by one of said two brake valve devices for opening communication from that brake valve device to said chamber and for closing communication from the other brake valve device to the chamber.

16. In a brake system for a train comprising a locomotive and one or more cars, in combination, a distributing valve device for pneumatically controlling application and release of the brakes on the locomotive, electropneumatically controlled means for controlling application and release of the brakes on the cars, a straight air self-lapping brake valve device for controlling operation of the electropneumatically controlled means, and a foot valve device having one position for subjecting said distributing valve device to control by said brake valve device and a different position for isolating said distributing valve device from said brake valve device.

17. In a braking system, in combination, a control pipe in which variation in fluid pressure is adapted to control the application and release of brakes on a vehicle, a foot valve device having a normally elevated, depressible foot plunger, and means operative in the elevated position of said plunger to render said brakes responsive to the variations in fluid pressure in said control pipe and in the depressed position to render said brakes nonresponsive to variations in fluid pressure in said control pipe.

18. In a braking system, in combination, a brake pipe, an automatic brake valve adapted to vary the pressure of fluid in said brake pipe, brake control means normally responsive to the variations in pressure in said brake pipe for effecting an application and release of brakes on a vehicle, a self-lapping brake valve device operative to vary the pressure of fluid in a chamber of said control means in accordance with a predetermined adjustment thereof, an independent brake valve device also operative to vary the pressure of fluid in said chamber for effecting an application and release of the brakes, and means adapted to be controlled by the self-lapping brake valve or by the independent brake valve and adapted to be conditioned by either of said brake valves to establish communication between one or the other of said brake valves and the chamber of said control valve means whereby said brake control means is controlled by the pressure of fluid in said chamber independently of variations of pressure in said brake pipe.

CHARLES H. McKINSTRY.